(No Model.)
E. BRUNER.
ICE TIRE FOR BICYCLE WHEELS.
No. 560,256. Patented May 19, 1896.
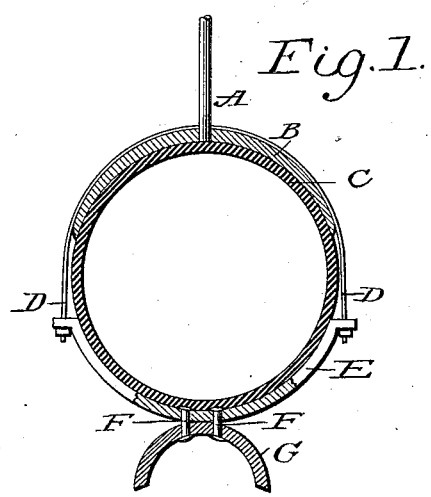
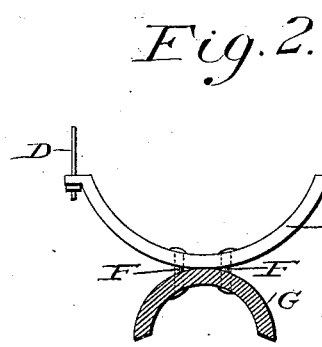
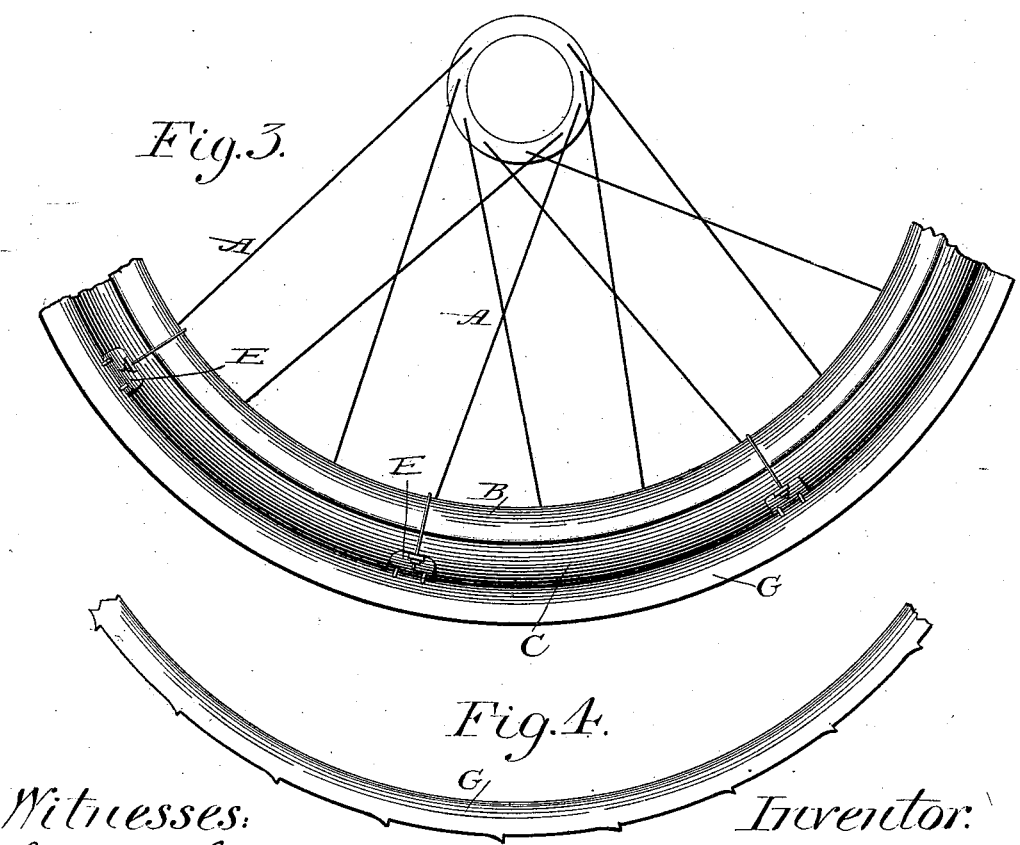
Witnesses:
Joe Harker
Will Harker
Inventor:
Ernest Bruner

UNITED STATES PATENT OFFICE.

ERNEST BRUNER, OF PLANO, SOUTH DAKOTA.

ICE-TIRE FOR BICYCLE-WHEELS.

SPECIFICATION forming part of Letters Patent No. 560,256, dated May 19, 1896.

Application filed November 8, 1893. Serial No. 490,392. (No model.)

*To all whom it may concern:*

Be it known that I, ERNEST BRUNER, a citizen of the United States, residing at Plano township, Hanson county, South Dakota, (post-office address Mitchell, South Dakota,) have invented a new and useful Improvement in Ice-Tires to be Used on Bicycles for the Purpose of Riding on Ice, of which the following is a specification, reference being had to the accompanying drawings.

My invention relates to an improvement in ice-tires to be used on bicycles or similar vehicles; and its object is to provide an ice-tire combined with a bicycle-wheel for use on snow and ice; and it consists in the form of the ice-tire and the attachments thereto and the manner of arrangement and combination of parts with the construction of details, as hereinafter described, and shown in the accompanying drawings, and more specifically pointed out in the claims.

I attain the above object by the devices illustrated in the accompanying drawings, in which like letters refer to like parts.

Figure 1 shows a view of my improved ice-tire in section, taken at a cross-line running through the plates E E and ice-tire G in position on pneumatic tire and rim of bicycle-wheel. Fig. 2 shows a view of my ice-tire similar to Fig. 1 with pneumatic tire and rim of wheel omitted. Fig. 3 shows a portion of a bicycle-wheel in side elevation with my improved ice-tire applied thereto. Fig. 4 shows a side view of a portion of my improved ice-tire detached.

In the drawings, A designates spoke of wheel; B, rim; C, pneumatic tire, and G shows one side of ice-tire proper, which is constructed in the following manner: It consists of a thin strip of metal bent in the form of a hoop or tire around the wheel of a bicycle, with its edges turned or bent up and outward from center of wheel. These edges are parallel throughout the length of the tire, and are both on the same level, and both run on the ice at the same time. To the rubber tire on wheel it presents a surface which is rounded in the direction of its width. The inner rounded surface lies upon the pneumatic tire except where the plates E E are between them. An end view taken sectionally would be U-shaped, with the round or lower end of the U toward the rubber tire of wheel, and the two edges or opposite ends of U as a bearing-surface to run on ice, as shown by G in all the figures.

On both edges of ice-tire used on driving-wheel small spurs H are turned up with the edge of a chisel, or notches filed in will answer the purpose. These spurs are necessary for taking a hold on the ice in going against the wind and in starting quickly.

The ice-tire just described is attached to the bicycle-wheel and held firmly in the center of same by the use of the plates E, which are riveted to the ice-tire where it comes in contact with rubber tire. The said plates are so shaped as to fit closely over the outside of pneumatic tire for a portion of its length, but not extending in a transverse direction to the rim of wheel. The inflation of the pneumatic tire causes the ice-tire to fit the pneumatic tire snugly. The rear ice-tire G is prevented from slipping lengthwise on the rubber tire by the tie rods or straps D D, which are attached to one end of plates E and then passed around the rim B and then fastened to the opposite end of same plate just back of a spoke of wheel.

The advantages to be gained by using a two-edged ice-tire in which both edges are on the same level and run on the ice at the same time except in turning are many. The principle is similar to that involved in a grooved ice-skate. A bicycle fitted with my improved ice-tire may be run through slush and snow and the groove or hollow be filled up, yet the edges will cut through enough to prevent slipping.

A very short or sharp turn may be made with a bicycle when fitted with my ice-tires without danger of slipping sidewise. This tire will spring in rubber tire almost enough to obtain the full elasticity of same. The ice being level no jar is felt.

To attach my improved ice-tire to a bicycle-wheel, first take wheel out of bicycle, then deflate pneumatic tire and slip ice-tire on, run tie straps or rods D around rim of wheel and attach to opposite end of plate, and then inflate pneumatic tire.

From the foregoing it will be seen that I provide a two-edged ice-tire that is strong, cheap, and will run smooth. The edges will always cut in the ice enough to prevent slipping sidewise, and the plates E and tie-straps D will hold ice-tire firmly in place on bicycle-wheel, and the spurs on edges will obtain a firm hold on the ice in going against the wind.

Having thus fully described my invention, what I claim as new, and desire to secure by Letters Patent, is—

1. An ice-tire for bicycles comprising a metallic hoop concave in cross-section, presenting two edges outward to form bearing-surfaces and provided with spurs or notches on said edges and means for securing said hoop to the rim of the wheel substantially as described.

2. An ice-tire for bicycles comprising a metallic hoop concave in cross-section with edges turned outward to form bearing-surfaces, cross-pieces secured upon said hoop and concaved to fit upon the rim of the wheel and tie rods or straps to secure said cross-pieces upon the wheel substantially as described.

ERNEST BRUNER.

Witnesses:
R. D. PRESCOTT,
F. D. POWERS.